Jan. 19, 1943.    G. A. LYON    2,308,618
WHEEL STRUCTURE
Filed Jan. 21, 1941
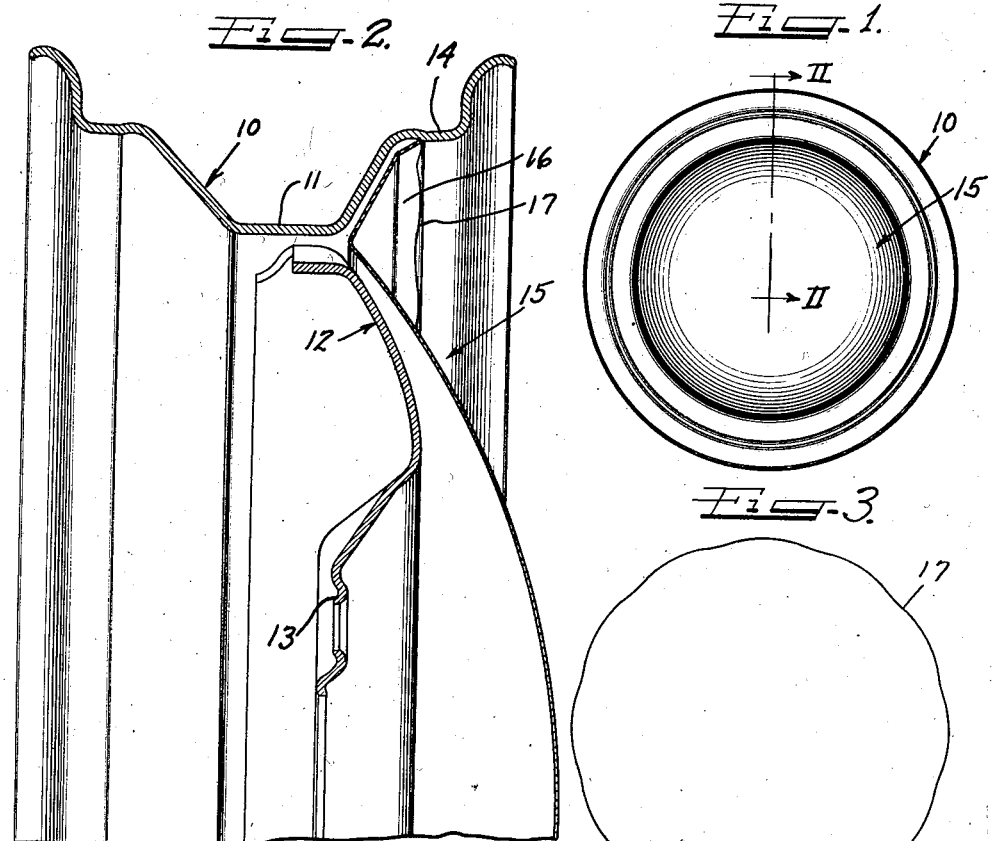
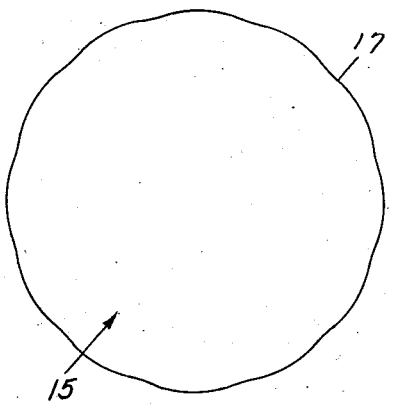
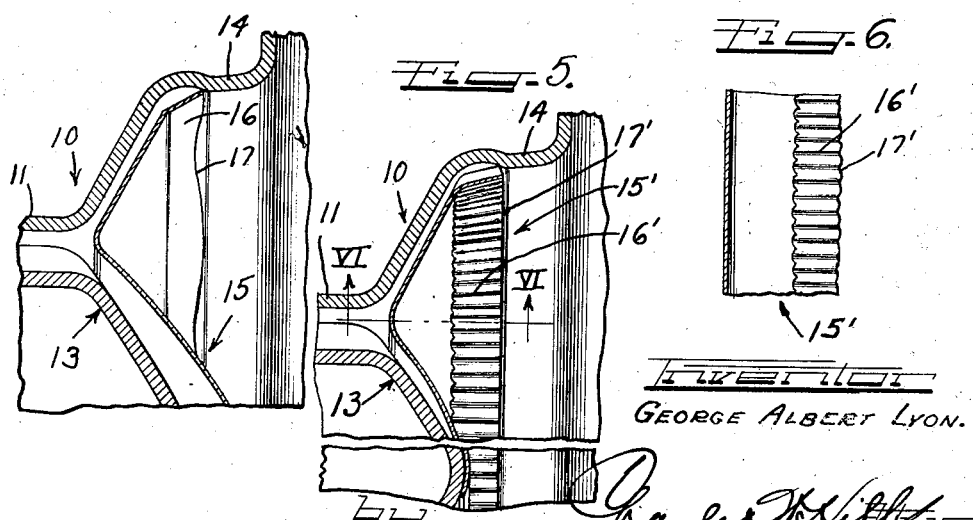
Inventor
GEORGE ALBERT LYON.

Patented Jan. 19, 1943

2,308,618

UNITED STATES PATENT OFFICE 2,308,618

WHEEL STRUCTURE

George Albert Lyon, Allenhurst, N. J.

Application January 21, 1941, Serial No. 375,175

7 Claims. (Cl. 301—37)

This invention relates to a wheel structure, and more particularly to the provision of a wheel structure wherein a cover member cooperates in a novel and simple way with the rim part of the wheel structure for the purpose of retaining the cover member on the wheel.

An object of this invention is to provide in a wheel structure a simple arrangement for enabling a cover member to be snapped into retaining cooperation with the rim part of the wheel.

Another object of this invention is to provide a wheel cover for a wheel which is self-retained on the wheel solely by reason of the flexible outer edge portion of the cover member.

Still another object of this invention is to provide a wheel cover member either in the form of a disk or annulus, which has means for retaining it on the wheel, and which does not detract from the appearance of the cover member.

In accordance with the general features of this invention, there is provided in a wheel structure including a body part and a multi-flanged drop center rim part which includes an outer axially extending flange having a hump, a cover member having a serpentine outer edge of a diameter greater than the inner diameter of the hump and flexible upon being pressed against the hump whereby the edge may be snapped over and behind the hump into cover member stressed retaining engagement with the rim part.

Still another feature of this invention relates to the corrugating or ridging of the outer marginal portion of the cover member adjacent its edge for strengthening the edge portion and for cooperating in the retention of the cover member on the wheel.

Other objects and features of this invention will more fully appear from the following detailed description taken in connection with the accompanying drawing which illustrates several embodiments thereof, and in which:

Figure 1 is a side view of a wheel structure embodying the features of this invention;

Figure 2 is an enlarged fragmentary cross sectional view taken on the line II—II of Figure 1 and illustrating the manner in which my wheel cover member cooperates with the rim part of the wheel;

Figure 3 is a more or less diagrammatic view illustrating the serpentine contour of the outer edge of the cover member;

Figure 4 is an enlarged fragmentary cross sectional view corresponding to an upper right hand portion of Figure 2 and showing more clearly the manner in which the outer serpentine edge portion of the cover member cooperates with the radial hump on the rim part;

Figure 5 is a fragmentary cross sectional view corresponding to Figure 4 but illustrating a modification of the invention wherein the outer edge portion of the cover member is corrugated and wherein the cover member is in the form of an annulus rather than in the form of a solid disk; and Figure 6 is a fragmentary detailed sectional view taken on the line VI—VI of Figure 5 looking upwardly and showing clearly the transverse or radial corrugations in the outer marginal edge of the cover member.

As shown on the drawing:

The reference character 10 designates generally a multi-flange drop center type of tire rim which comprises one part of the automobile wheel. This tire rim part includes a base flange 11 fastened by any suitable means to a central wheel body part 12 which is of convex-concave cross sectional shape and includes the usual central bolt-on flange 13. The tire rim part 10 has one of its axially extending outer flanges provided with an annular hump or protuberance 14 in which the bead of a tire is adapted to be seated, and which cooperates in retaining the tire bead in place in the event of sudden rupture or deflation of the tire.

It will, of course, be perceived that by reason of the fact that the annular hump 14 is depressed radially inward it provides a groove in which the tire bead, as noted above, is adapted to be seated. It is the aim of this invention to utilize this depressed section or hump 14 as a means for aiding in the retention of a wheel cover member, designated generally by the reference character 15, on the wheel.

It should be noted that the wheel cover member 15 may be in the form of a solid disk or hub cap as shown in Figure 2 or may be in the form of an annulus as shown in the modification of Figure 5. This cover member is preferably stamped from relatively thin sheet metal such as stainless steel or the like and may, of course, be suitably ornamented as desired. Such a cover member may, for example, be made from sheet steel having a thickness of .020".

The cover member, as it will be perceived from Figures 2, 4, and 5, has a cross sectional shape conforming generally to the outer cross sectional configuration of the rim and body parts of the wheel. In addition to including a portion for disposition over the body part of the wheel, the cover member 15 includes the diagonally outwardly extending outer margin 16 which terminates in a serpentine or tortuous edge 17. This edge normally has a diameter slightly in excess of the inner diameter of the surface of the hump 14 so as to require flexing of the edge in order for it to pass over and behind the hump to the retaining position shown in Figures 2, 4, and 5 of the drawing. By making the edge 17 of a serpentine shape, it will, of course, be appreciated that the edge does not require as much flexing as it would if it were a true circular edge in order for it to be snapped over and behind the hump 14. In other words, it is only necessary to flex the alternate high spots of the serpentine edge in order for it to be flexibly and resiliently forced into cover member retaining cooperation with the rear side of the hump. Then, too, by making the portion 16 so that it extends diagonally outward, it will, of course, be appreciated that the edge 17 is so directed that it may be most effectively used to concentrate its retaining force on the rear side of the hump 14.

In Figures 5 and 6, I have illustrated a modification of the invention wherein the cover member 15' is in the form of an annulus as noted before. This cover member is cooperable with the same wheel shown in Figures 2 and 4, and hence the same reference numerals have been used to designate the parts of this wheel. The cover member 15' of this form of the invention, like the cover 15, has a cross sectional configuration corresponding generally to the outer contour of the parts of the wheel over which the member is disposed. As in the preferred form of the invention, the outer marginal portion 16' of the cover member extends diagonally outward but instead of having its extreme outer edge cut to provide the serpentine effect previously described, the marginal portion itself is corrugated. By reason of the corrugations in the portion 16' the outer edge 17', as best shown in Figure 6, is in reality given a tortuous or serpentine configuration. Moreover, as in the preferred form of the invention alternate outwardly extending high points of this edge are adapted to contact the rear side of the hump 14 from the cover member being pressed in an axial direction against the wheel. These corrugations tend to strengthen the outer marginal portion of the cover member, without detracting from the efficacy of the edge in its retaining function. Also, the corrugations lend themselves admirably to decoration in addition to providing for ventilating openings through which air can circulate from behind the cover member and through the usual openings in the wheel body at the junction of the wheel body with the rim part.

In both forms of the invention, the cover member may be easily applied to the wheel by simply pressing it axially on the wheel until its outer edge has snapped over and behind the hump 14 into retaining engagement therewith. Similarly, the cover member may be removed from the wheel by inserting a suitable pry-off tool under the serpentine or corrugated edge of the cover member and forcibly ejecting the cover member from the wheel.

It should also be noted that in both forms of the invention the cover member when it is on the wheel is under tension since its serpentine or corrugated edge has been deflected from its normal position and is held from springing back by the hump on the tire rim. Thus, this edge is in resilient gripping engagement with the rim of the wheel.

I claim as my invention:

1. In a wheel structure, a wheel including a body and a multi-flanged drop center rim part, said rim part including an outer axially extending flange provided with a hump, and a circular cover member having a serpentine outer edge with crest portions lying in a circle of a diameter greater than the inner diameter of said hump and flexible upon being pressed against said hump whereby said edge may be snapped over and behind said hump into stressed cover member retaining engagement with said rim part.

2. In a wheel structure, a wheel including a body and a multi-flanged drop center rim part, said rim part including an outer axially extending flange provided with a hump, and a circular cover member having a serpentine outer edge with crest portions lying in a circle of a diameter greater than the inner diameter of said hump and flexible upon being pressed against said hump whereby said edge may be snapped over and behind said hump into cover member retaining engagement with said rim part, said cover member having its outer marginal portion radially corrugated.

3. In a wheel structure, a wheel including a body and a multi-flanged drop center rim part, said rim part including an outer axially extending flange provided with a hump, and a circular cover member having a serpentine outer edge with crest portions lying in a circle of a diameter greater than the inner diameter of said hump and flexible upon being pressed against said hump whereby said edge may be snapped over and behind said hump into cover member retaining engagement with said rim part, said cover member having its outer marginal portion radially corrugated, said corrugated portion having alternate corrugations in contact with the rear side of said hump.

4. As an article of manufacture, a circular cover member for retaining cooperation with an inwardly axially extending hump on the flange of a wheel rim part, said cover member having a diagonally turned outer marginal portion provided with a serpentine edge flexible over and behind the hump on the rim part for retaining cooperation therewith, said diagonal portion being radially corrugated with alternate corrugations projecting radially outward for retaining engagement with the rear side of the hump on the rim part.

5. In a wheel structure, a wheel including a body and a multi-flanged drop center rim part, said rim part including an outer axially extending flange provided with a hump, and a circular cover member having a serpentine outer edge with crest portions lying in a circle of a diameter greater than the inner diameter of said hump and flexible upon being pressed against said hump whereby said edge may be snapped over and behind said hump into cover member retaining engagement with said rim part, said cover member having its outer marginal portion turned diagonally outwardly and terminating in said serpentine edge.

6. In a wheel structure, a wheel including a body and a multi-flanged drop center rim part, said rim part including an outer axially extending flange provided with a hump, and a circular cover member having a serpentine outer edge with crest portions lying in a circle of a diameter greater than the inner diameter of said hump and flexible upon being pressed against said hump whereby said edge may be snapped over and behind said hump into cover member retaining engagement with said rim part, said cover member having its outer marginal portion turned diagonally outwardly and terminating in said serpentine edge, said diagonal portion being corrugated in a radial direction.

7. In a wheel structure, a wheel including a body and a multi-flanged drop center rim part, said rim part including an outer axially extending flange provided with a hump, and a circular cover member having an outer edge flexible upon being pressed against said hump whereby said edge may be snapped over and behind said hump into cover member retaining engagement with said rim part, said edge having alternate high points whereby the edge can contact the rear side of the hump at spaced intervals.

GEORGE ALBERT LYON.